(12) United States Patent
Kittoe (10) Patent No.: US 10,280,067 B2
(45) Date of Patent: *May 7, 2019

(54) MULTIPLE NON-MANIFOLDED FUEL TANKS ON A TRAILER

(71) Applicant: Robinson Metal, Inc., De Pere, WI (US)

(72) Inventor: Keith Kittoe, Greenbay, WI (US)

(73) Assignee: Robinson Metal, Inc., De Pere, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,942

(22) Filed: Jun. 10, 2016

(65) Prior Publication Data
US 2017/0267513 A1    Sep. 21, 2017

Related U.S. Application Data

(60) Provisional application No. 62/310,669, filed on Mar. 18, 2016.

(51) Int. Cl.
| | |
|---|---|
| *B60P 3/24* | (2006.01) |
| *B67D 7/78* | (2010.01) |
| *B60P 3/22* | (2006.01) |
| *B67D 7/04* | (2010.01) |
| *B67D 7/16* | (2010.01) |
| *B67D 7/40* | (2010.01) |
| *B67D 7/62* | (2010.01) |
| *B67D 7/84* | (2010.01) |

(52) U.S. Cl.
CPC .............. *B67D 7/78* (2013.01); *B60P 3/225* (2013.01); *B60P 3/228* (2013.01); *B60P 3/2265* (2013.01); *B60P 3/24* (2013.01); *B67D 7/04* (2013.01); *B67D 7/16* (2013.01); *B67D 7/40* (2013.01); *B67D 7/62* (2013.01); *B67D 7/845* (2013.01)

(58) Field of Classification Search
CPC ... B67D 7/78; B67D 7/16; B67D 7/62; B67D 7/845; B67D 7/40; B67D 7/04; B60P 3/24; B60P 3/228; B60P 3/2265; B60P 3/225

See application file for complete search history.

(56) References Cited

U.S. PATENT DOCUMENTS

| | | | | |
|---|---|---|---|---|
| 2,421,765 | A * | 6/1947 | Taylor | B60P 3/243 137/208 |
| 2,498,229 | A * | 2/1950 | Adler | B60P 3/14 119/DIG. 1 |
| 3,147,886 | A * | 9/1964 | Sacco | B60P 3/224 222/144.5 |
| 4,131,214 | A * | 12/1978 | Rogers | B60P 3/225 222/1 |
| 4,911,330 | A * | 3/1990 | Vlaanderen | B60P 3/224 222/132 |
| 7,070,096 | B2 * | 7/2006 | Muller | B60S 5/02 222/132 |
| 7,484,521 | B2 * | 2/2009 | Kimbara | F17C 13/025 137/14 |

(Continued)

*Primary Examiner* — Nicolas A Arnett
(74) *Attorney, Agent, or Firm* — Andrus Intellectual Property Law, LLP (57) ABSTRACT

A system of multiple non-manifolded fuel tanks on a trailer and preferred embodiments which allow for improved access to the contents of each fuel tank and ability to transport multiple fuel types in a single system.

22 Claims, 10 Drawing Sheets

(56) References Cited

U.S. PATENT DOCUMENTS

| | | | | |
|---|---|---|---|---|
| 8,807,599 | B2* | 8/2014 | Brown | G06Q 10/06313 |
| | | | | 280/837 |
| 2009/0200333 | A1* | 8/2009 | Bauer | B60P 3/14 |
| | | | | 222/1 |
| 2011/0048572 | A1* | 3/2011 | Batson | B64F 1/28 |
| | | | | 141/1 |
| 2014/0263350 | A1* | 9/2014 | Sheppard | B65D 88/54 |
| | | | | 220/500 |
| 2015/0013838 | A1* | 1/2015 | Polzin | B67D 7/845 |
| | | | | 141/94 |
| 2017/0275149 | A1* | 9/2017 | Schmidt | B67D 7/365 |
| 2017/0313570 | A1* | 11/2017 | Kittoe | B67D 7/3209 |
| 2018/0025345 | A1* | 1/2018 | Kittoe | G06Q 20/24 |
| | | | | 705/41 |

* cited by examiner

MULTIPLE NON-MANIFOLDED FUEL TANKS ON A TRAILER

FIELD OF THE INVENTION

The present invention relates to a system of multiple non-manifolded fuel tanks on a trailer.

BACKGROUND

In the present art area of fuel trailers and fuel equipment offerings, models, and options, the same types and styles have remained largely unchanged leaving demand for an intermediate size solution that offers versatility and still complies with federal regulations unfulfilled. Presently, if a consumer for personal use, business for commercial use, or government and military buyer for their uses needs a mobile fueling trailer, their options are limited to small 5-gallon style jugs and cans or 14-20 gallon size gravity fed tanks typically mounted on dolly-type 2-wheel platforms, small 4-wheel wagons and pull carts, auxiliary tanks permanently installed into the bed of single vehicle pickup trucks, or multi-hundred gallon 1000 gallon capacity single tank trailers predominantly found and used in the agriculture industry. The lack of mobile fueling solutions available in between the small container sizes up to the larger 1000 gallon sizes represents a significant gap in the present prior art.

If one needs to transport fuel in a storage tank or tank trailer for use in commerce, operators transporting different types of fuels such as gasoline and diesel, are required by federal regulations to have a commercial driver's license and hazmat rating endorsement if the single tank being used has a capacity that exceeds 450 liters, approximately 119 gallons. These larger tanks are classified as bulk tanks or cargo tanks, depending on their size and use. Typically, the truck, trailer, or other motor vehicle being used to transport these larger tanks also has to meet the requirements of certain federal safety standards and additional regulations. DOT 406 and similar variations of the 406 indication are the most commonly known cargo tank regulations and specification requirements in the petroleum equipment and fuel transport industry regarding the types of tanks used to transport flammable liquids such as gasoline.

In most states, gasoline and similar types of fuels are not to be transported for use in commerce in containers larger than 5-gallon capacity sizes, or other similar small capacity sizes. Whereas, if a fuel tank container or fuel tank motor vehicle is purchased from a manufacturer with a DOT special permit, operators are exempt from needing a DOT 406 tank or cargo tank vehicle when transporting fuel in the present invention with multiple non-manifolded fuel tanks on a trailer with single tank capacities under 450 liters or 119 gallons.

An example of potential prior art in the market can be found at: http://thundercreek.com/products/multi-tank-trailers.html Similar to other larger capacity, single tank fuel trailer models on the market, this prior art example has many of the same features, specifications, and characteristics that make it obviously and significantly different than the present invention when examined by operators and other individuals familiar with fuel transport equipment and hazardous material requirements. Common in the prior art are the use of a trailer to transport fuel, the use of a fuel pump, the common style of discharge hose reel, hose, and nozzle, as well as the use of a grounding cable reel which prevents static spark discharge between fuel trailer and vehicle or equipment being fueled. The ground cable is clipped onto the metal frame of a vehicle to ground that vehicle and the fuel trailer together before touching the metal nozzle to the fill port on the vehicle. Also common in the prior art is the use of a filtration system which removes all particulates, debris, water, and other unwanted elements in the fuel, tank, or other areas before fuel is discharged into the vehicle or equipment being filled up. Different types of filters are commonly available and known to remove/filter different elements.

SUMMARY OF THE INVENTION

The tanks and containers detailed in the present invention are built to the specifications required in a Department of Transportation (DOT) Special Permit. By doing so, the present invention is compliant for use in commerce with Class 3 Flammable Liquids, specifically gasoline, aviation gasoline, methanol, ethanol, jet turbine fuels, and other flammable liquids with a flash point below 100 degrees Fahrenheit. In addition, even though they are typically classified as Class 3 Flammable Liquids on their own, a Special Permit also permits the legal transportation of diesel, kerosene, and fuel oils that are considered combustible liquids by the DOT when being transported on roads and highways due to their flash point being above 100 degrees Fahrenheit.

Additional examples of known restrictions of the current prior art and how the present invention is a significant improvement over them are: (1) the prior art has manifolded tanks and manifolded fuel lines which effectively cause the tanks to become one single large tank compared to the present invention which has independent, non-manifolded tanks and independent fuel lines that allow the tanks to maintain their independence thereby not exceeding the tank capacity requirements of a non-bulk container; (2) the prior art uses a steel tank material construction compared to the present invention in which a preferred embodiment includes an aluminum tank material construction which significantly reduces the weight of the tanks and provides the correct chemical compatibility required for long-term use with gasoline and more corrosive flammable liquids, however the present invention can be made with steel tanks as well; (3) the prior art focuses on a tank design to transport diesel fuel compared to the present invention which allows for the transportation of flammable liquids, specifically gasoline, aviation gasoline, methanol, ethanol, jet turbine fuels, and other flammable liquids with a flash point below 100 degrees Fahrenheit; (4) applications for the prior art are limited to combustible liquids only whereas the present invention can be used in applications requiring the legal transportation in commerce of both flammable liquids and combustible liquids; (5) the prior art consists of tanks built to conform to federal regulations compared to the present invention in which the tanks are authorized by the Federal Department of Transportation for their intended uses, offering another significant improvement.

The present invention is a multiple non-manifolded fuel tank trailer for use in commerce or private use with each tank having a capacity of under 119 gallons that has a primary purpose of transporting and discharging flammable and combustible liquids. Examples of commonly transported flammable and combustible liquids include but are not limited to gasoline, motor gasoline, MoGas, diesel, kerosene, aviation gasoline (AvGas or AV gasoline), 100 low lead (100LL), jet turbine fuel (Jet A or JP8), ethanol, ethyl alcohol, or methanol.

With these fuel types, operators and previous fuel trailers are limited to transporting, discharging, or storing only a single type of fuel. Whereas, the present invention allows for different types and different grades of fuel to be transported and discharged from a single vehicle platform. Various discharge methods and configurations are possible while remaining cross-contamination free from different fuel types. Possible solutions are using a single pump to draw fuel from one tank at a time when all tanks have the same fuel type in them, or using multiple pumps concurrently from separate tanks with the same fuel type or fuel grade, or using multiple pumps concurrently with different fuel types drawn from different tanks.

The transportation of Class 3 Flammable Liquids in commerce makes them a federally regulated hazardous material under most circumstances and conditions. As a result, single container tanks that exceed certain size and type classifications can lead to increased costs, requirements, training, and other factors for both the operators and companies involved in the transportation process. For example, DOT 406 specification tank costs for single containers over 119 gallons in capacity used to transport gasoline are significantly more expensive to manufacture and produce due to the American Society of Mechanical Engineers material and welding requirements. The present invention utilizes multiple smaller tank containers that are each under 119 gallons or 450 liters in capacity to still achieve the total capacity needed on a single trailer or vehicle platform. The present invention can significantly reduce total costs. The present invention is able to achieve this significant cost savings by following manufacturing requirements and design specifications that are different than those of standard DOT 406 cargo tanks and cargo tank vehicles. The present invention allows for the ability to transport multiple non-manifolded fuel tanks on a trailer as a single system which allows the user to fill each tank with a different liquid or to fill each tank with the same liquid, while allowing the user to maintain the independence of each tank, which allows the invention to maintain compliance with federal regulations and safety concerns.

On prior art, the multiple tanks on the trailer have multiple fuel lines that manifold together into a permanent, single fuel line that typically connects to the intake of a single fuel pump. The fuel is then commonly discharged out of the pump through a discharge hose and nozzle. Whereas, when two or more tanks are installed and configured on the present invention, none of the tanks are manifolded together. This is because multiple tanks that are manifolded together are considered as and act as, one tank with multiple compartments. In a preferred embodiment, the present invention has completely separate fuel lines that are independent of the other. If one or multiple of the tanks are completely removed from the fuel trailer, the remaining tanks will continue to be useable and operate exactly as the tanks did prior to the removal or separation of any of the other tanks.

On prior art, tanks are commonly constructed out of steel for limited use such as with diesel or kerosene, whereas gasoline is not compatible with steel and will cause it to degrade, corrode, and rust. In a preferred embodiment of the present invention the tanks are constructed out of aluminum for compatibility with gasoline and other flammable liquids that are more corrosive than diesel, kerosene, or other combustible liquids. An aluminum tank is compatible with diesel, kerosene, and other combustible liquids as well.

An improvement of the present invention over the prior art is the inclusion of a quick connect and disconnect valve system for non-manifolded tank configurations. This allows multiple fuel tanks to connect together without manifolding the tanks or fuel lines permanently together. This configuration allows a multiple tank configuration to work with a single discharge pump, multiple discharge pumps, or gravity style drain lines. In a preferred embodiment of the present invention, further improved components such as the purging reverse flow system is used to drain the fuel line contents back into their tanks. This can be accomplished with the use of mechanical or electronically controlled valves or by reversing the polarity of the fuel pump which reverses the direction of flow in the fuel lines. A further improvement over the prior art of the present invention in a preferred embodiment that includes a custody transfer flow meter built to all required specifications for Weights and Measures approval and certification. This allows for the legal sale of accurate quantities of fuel. The use of a Weights and Measures approved custody transfer flow meter is known, however its inclusion on a multi-tank trailer in addition to the entire configuration of fueling components is novel and not present in the prior art.

DETAILED DESCRIPTION OF THE PREFERRED EMBODIMENTS

Figure 1:
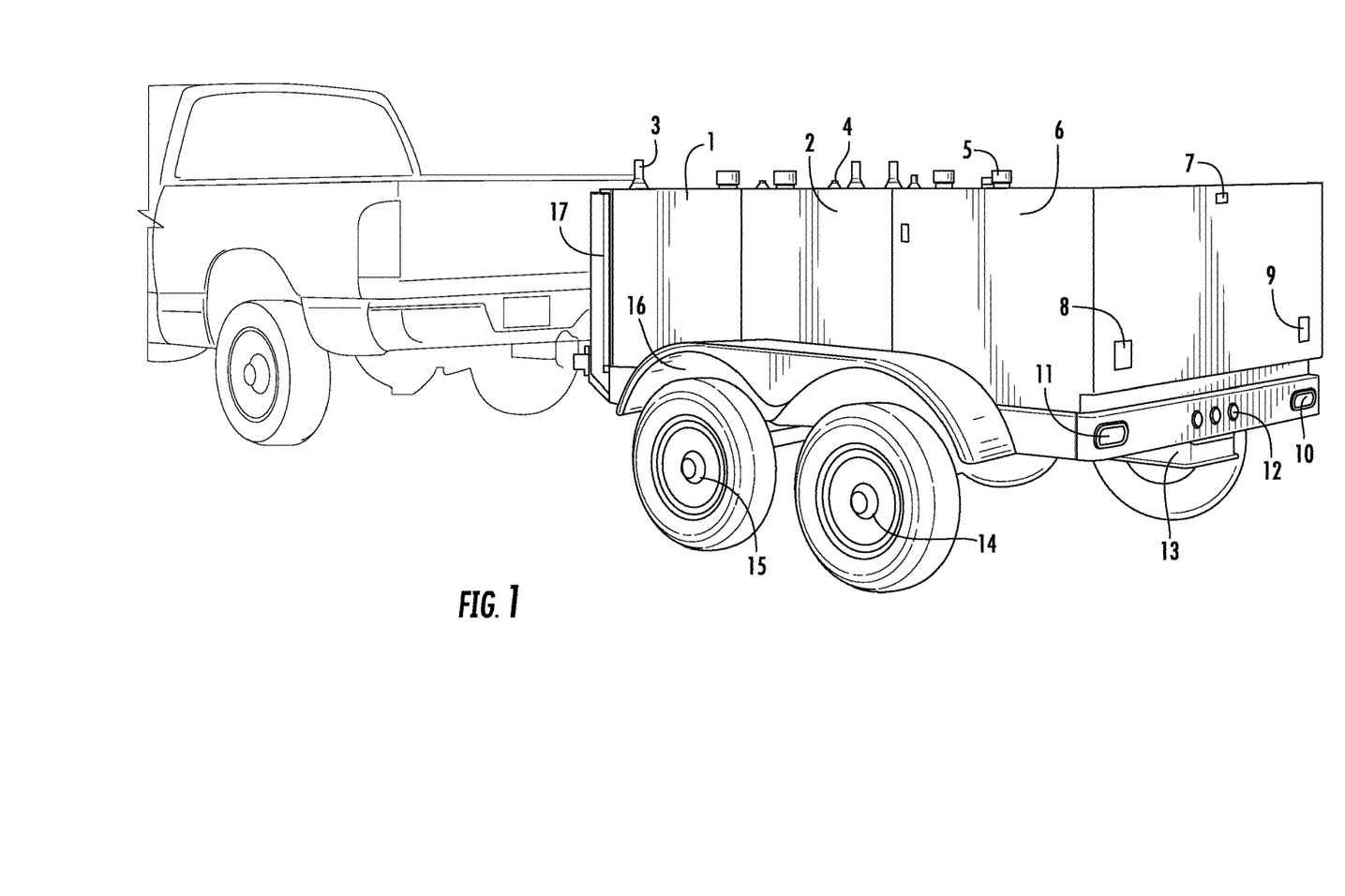
FIG. 1 is a perspective view showing the present invention.

FIG. 1 shows a perspective view of the present invention in an assembled state. The present invention has multiple non-manifolded fuel tanks 1, 2, 19, and 20; with tanks 19 and 20 not visible from the perspective of FIG. 1. It is understood that depending on the number of tanks in a given embodiment of the present invention, each tank 1, 2, 19, and 20 will have an individual independent fuel level gauge 3, pressure vent and roll over valve 4, and lockable fill cap 5. Further in a preferred embodiment the fuel level gauges 3 and the lockable fill caps 5 through which the tanks are filled, are laid out such that the fuel level gauges are easily visible from the outside edge of the system and the lockable fill caps 5 are located on the outside edge and next to each other to ease filling the tanks. In a preferred embodiment, the present invention includes a rear enclosure 6 and a front enclosure 17. The rear enclosure 6 can include an external camera 7 and handles with door locks 8 and 9. The present invention includes components typical of trailers such as right 10 and left 11 turn signals, tail lights, and brake lights, marker lights 12, enough wheels 14 and 15 to support the weight of the invention when all tanks 1, 2, 19, 20 are filled with fuel, and in a preferred embodiment a protective fender 16 may be added around the wheels 14 and 15. There is also a fuel line channel 13 which is housed on the bottom of the present invention.

Figure 2:
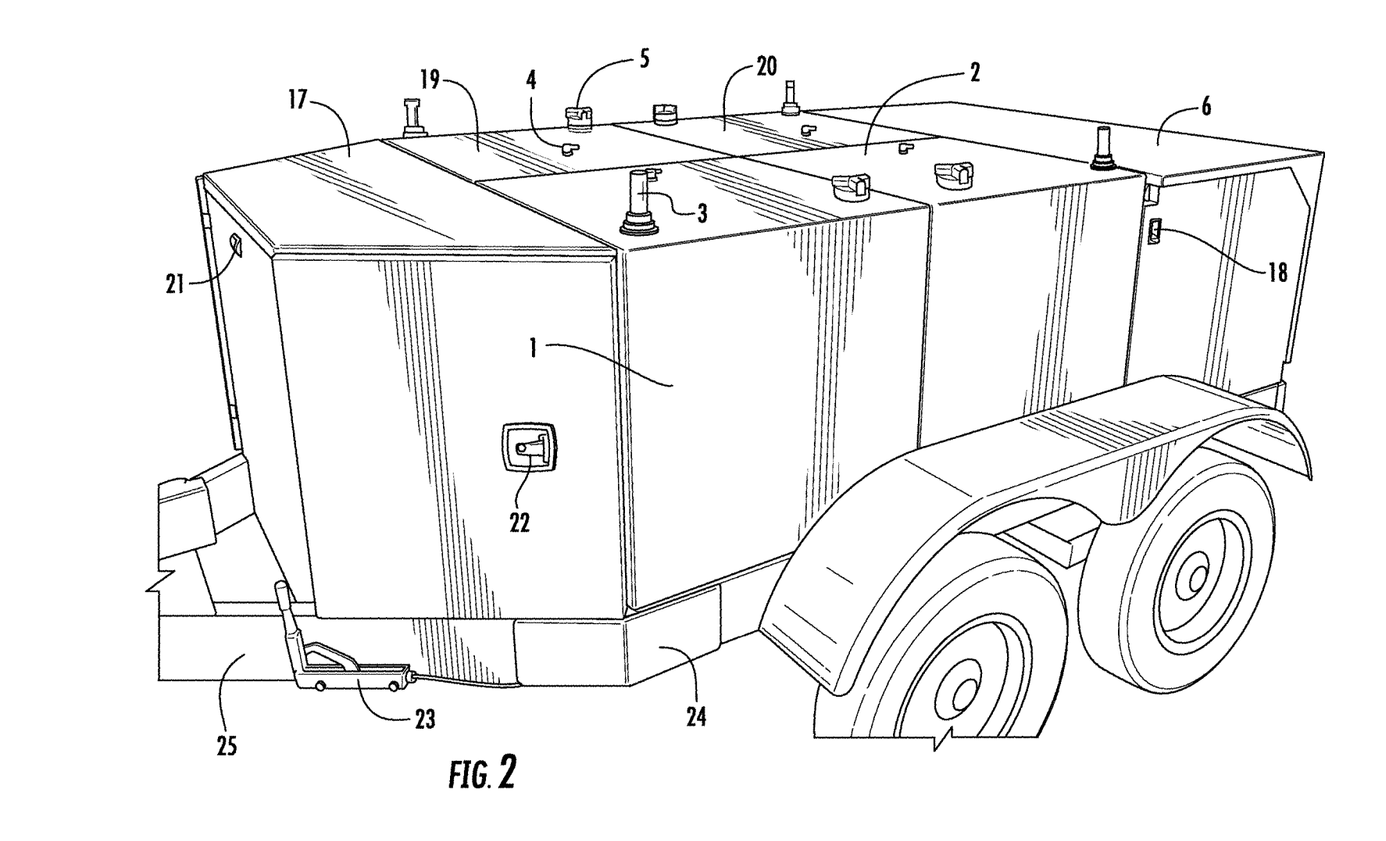
FIG. 2 is a perspective view showing the outside of the present invention.

FIG. 2 shows a perspective view showing the outside of the present invention. From this view the configuration of the non-manifolded fuel tanks 1, 2, 19, 20 are visible. In a preferred embodiment the front enclosure may have a front facing camera 21 and a lockable door handle 22. The present invention is towed with a draw bar 25 which in a preferred embodiment may have a removable draw bar bracket 24. The draw bar 25 may further have a parking brake 23 control. In a preferred embodiment the rear enclosure 6 may have an outward facing camera 18 on each side to assist the driver with parking maneuvers and provide security surveillance. In this figure, the preferred configuration described above of the fuel level gauge 3, pressure vent and roll over valve 4, and lockable fill cap 5 are visible.

Figure 3:
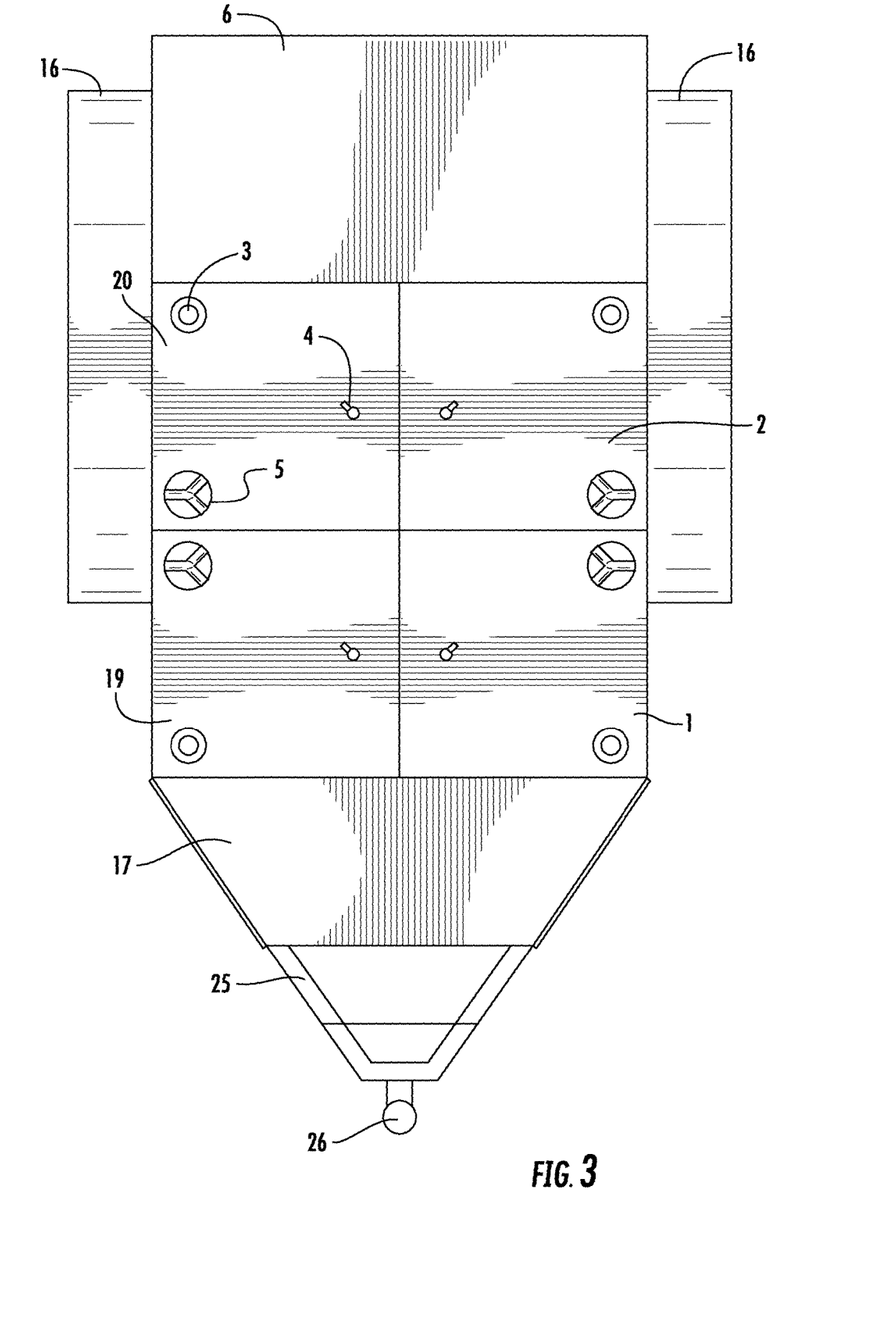
FIG. 3 is a top down view which depicts an embodiment of the present invention with four tanks and a potential configuration of the tanks.

FIG. 3 is a top down view which depicts an embodiment of the present invention with four tanks and a potential configuration of the tanks. In a preferred embodiment, the non-manifolded fuel tanks 1, 2, 19, 20 are configured with the tanks being placed two by two. The draw bar 25 is attached to a standard coupler or tow hitch 26. Each tank 1, 2, 19, 20 has a fuel level gauge 3, pressure vent and roll over valve 4, and lockable fill cap 5. In a preferred embodiment the lockable fill cap 5 of the non-manifolded fuel tanks 1, 2, 19, 20 would be placed towards the outer most edge of the tank and towards any shared edges with other fuel tanks to allow for ease of access while filling the tanks. It is understood that while the present depiction shows four non-manifolded fuel tanks, the present invention allows for the expansion or contraction of the trailer size to incorporate additional or fewer non-manifolded fuel tanks as desired.

Figure 4:
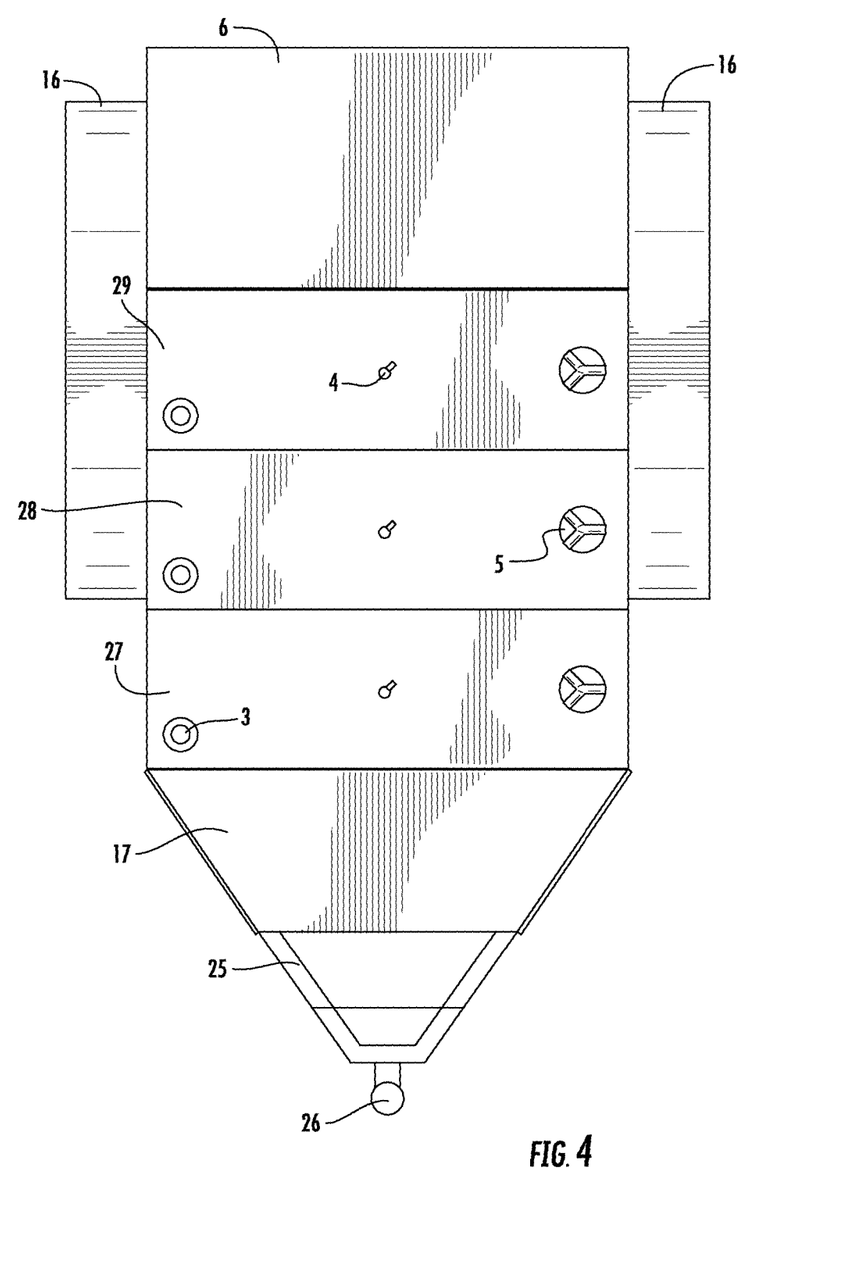
FIG. 4 is a top down view which depicts another embodiment of the present invention with three tanks and another potential configuration of the tanks.

FIG. 4 is a top down view which depicts another preferred embodiment of the present invention with three non-manifolded fuel tanks 27, 28, 29 and another potential configuration of the fuel tanks. Each tank 27, 28, 29 has a fuel level gauge 3, pressure vent and roll over valve 4, and lockable fill cap 5. In a preferred embodiment the lockable fill cap 5 of the non-manifolded fuel tanks 27, 28, 29 would be placed towards the outer most edge of the tank to allow for ease of access while filling the tanks. It is understood that while the present depiction shows three non-manifolded fuel tanks, the present invention allows for the expansion or contraction of the trailer size to incorporate additional or fewer non-manifolded fuel tanks as desired.

Figure 5:
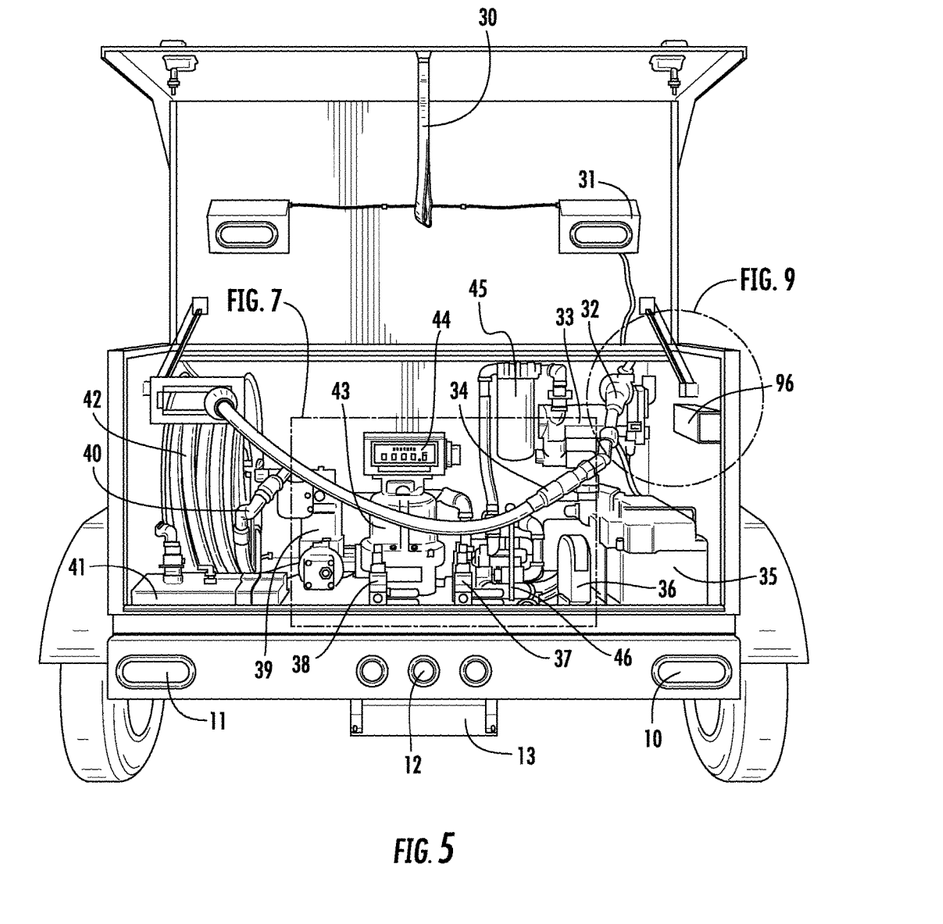
FIG. 5 is a rear view showing an embodiment of the present invention with a hatch back access configuration.

FIG. 5 is a rear view showing an embodiment of the present invention with a hatch back style access to the rear enclosure 6. In a preferred embodiment, on the inside of the hatch back lid there is a pull down handle 30 and mounted interior dome lights 31. In a preferred embodiment of the present invention, the components inside of the rear enclosure 6 are a fuel pump 33, a battery 35, a fuel nozzle 32 which in a preferred embodiment is connected to the fuel hose 42 by a quick release fitting 34, a filter 45, a ground cable reel 36, a fuel purge system 46, non-spill quick connect tank valves 37 and 38 used to access fuel from specific tanks, a custody transfer flow meter 43 with a meter register 44, an air eliminator 39 with a vent tank 41, and a non-spill quick connect multi-tank selector valve 40 to pump intake. The fuel pump 33 is powered by the battery 35 and is able to be connected to each tank individually through the non-spill quick connect multi-tank selector valve 40 which connects to the pump intake and the non-spill quick connect tank valves 37 and 38 which connect to individual tanks. It is understood that depending on the number of tanks in a given embodiment of the present invention, each tank will have an individual non-spill quick connect tank valve 37 or 38 in the rear enclosure 6 allowing access to the fuel in a particular tank. In a preferred embodiment, the flow of fuel from the tanks is monitored by a custody transfer flow meter 43 which has a meter register 44 that allows the end user to monitor how much fuel has been dispensed. Once fueling is completed and in order to comply with federal regulations, a preferred embodiment of the present invention includes a fuel purge system 46 which once activated will reverse the flow of any remaining fuel out of the fuel hose 42 and back into a user selected tank.

Figure 6:
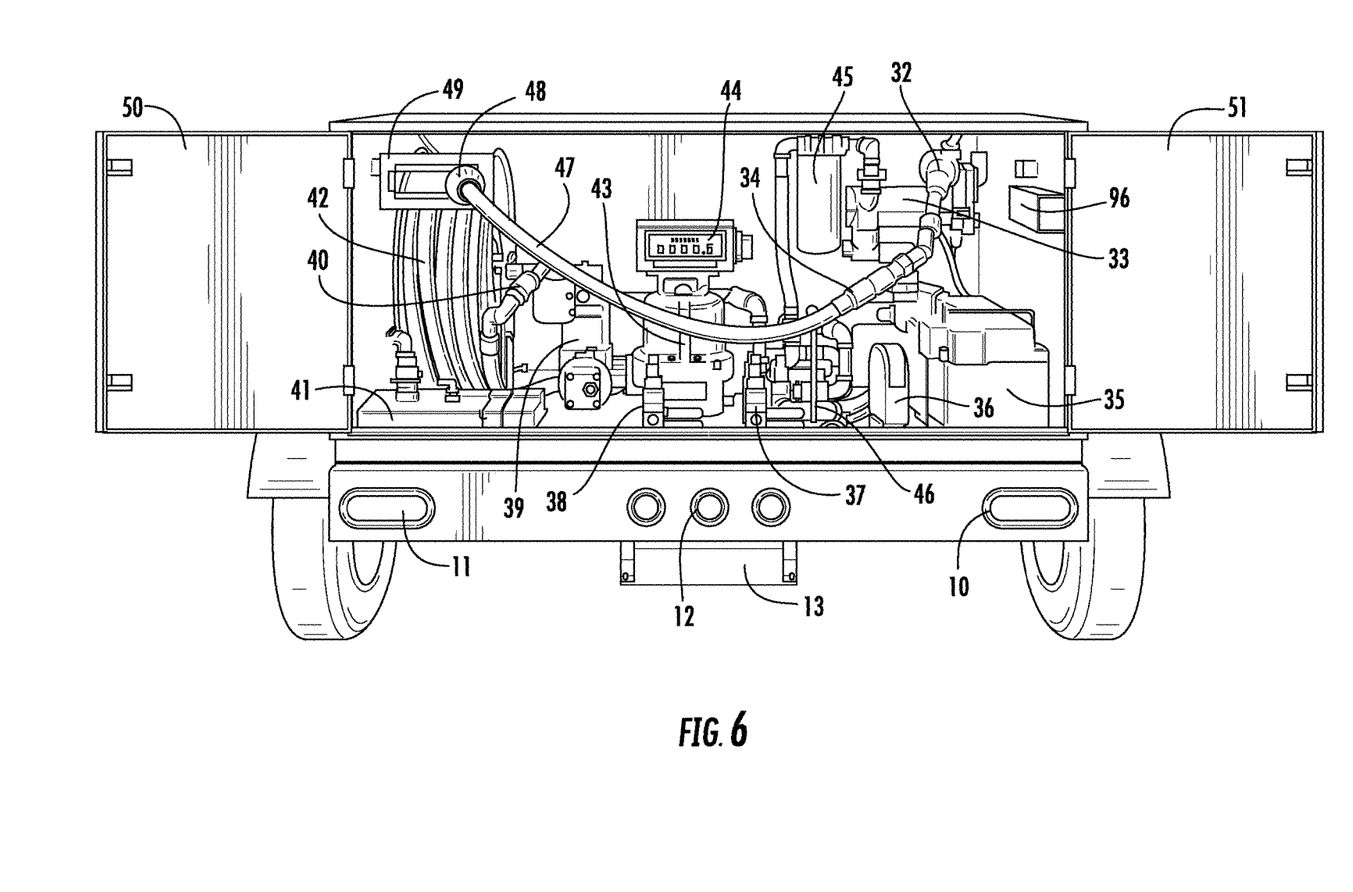
FIG. 6 is a rear view showing another embodiment of the present invention with a dual door access configuration.

FIG. 6 is a rear view showing another embodiment of the present invention with a dual door access configuration. This embodiment utilizes two rear swing doors 50 and 51 that open outward to provide access to the rear enclosure 6. In a preferred embodiment, the fuel pump 33 can be activated by a power switch 96. In a preferred embodiment, the hose reel 42 has the fuel hose 47 pass through a hose reel guide 49 and the fuel hose 47 would include a hose ball stop 48 to prevent the hose from fully retracting onto the hose reel 42.

Figure 7:
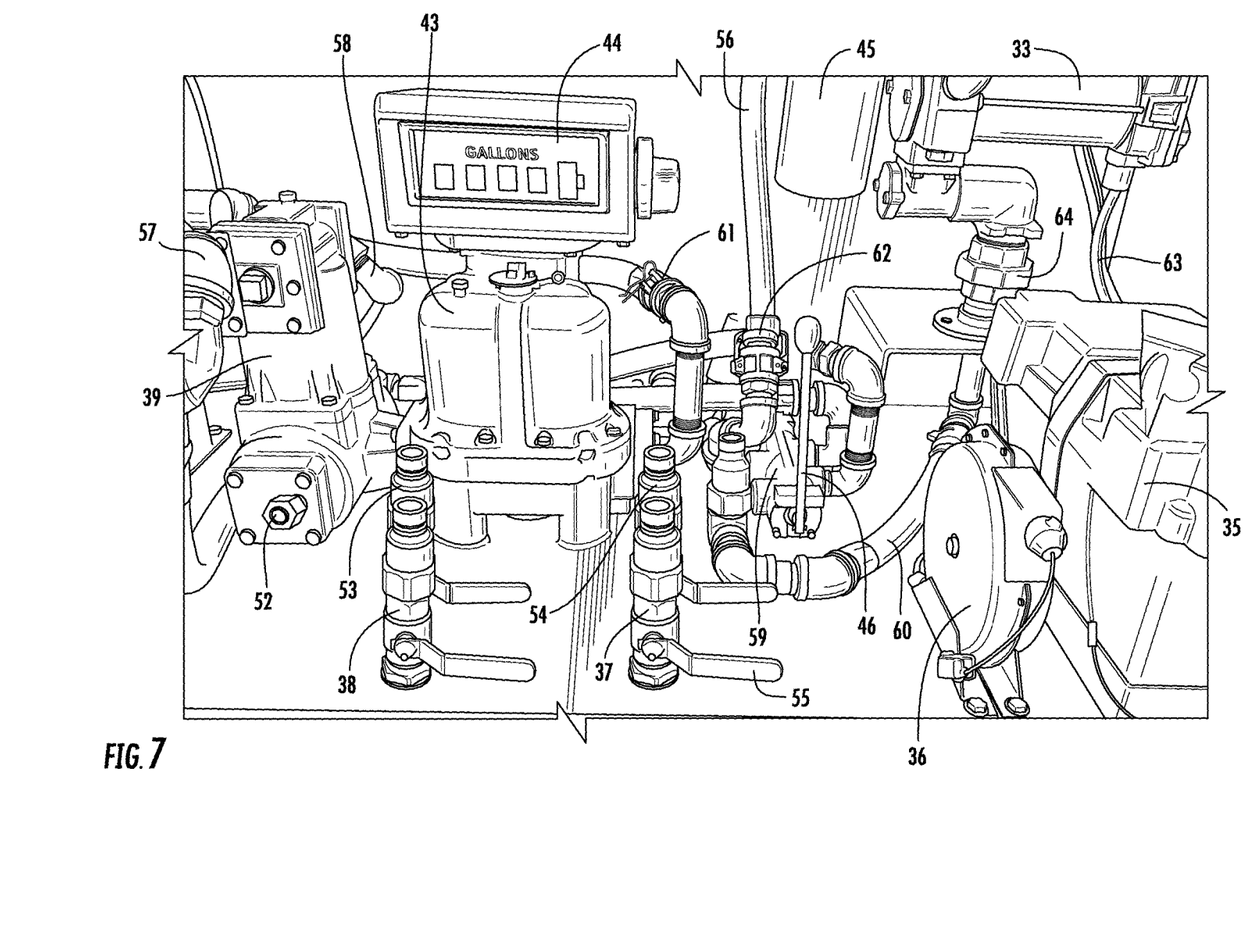
FIG. 7 is an exploded perspective view showing an embodiment of the internal components of the rear enclosure.

FIG. 7 is an exploded perspective view showing an embodiment of the internal components of the rear enclosure. From this view one is able to notice details of the preferred embodiment of the present invention's internal components. A preferred embodiment of the individual non-spill quick connect tank valves 37, 38, 53, 54 include a shut off handle 55 on each valve. As described earlier, each non-spill quick connect tank valve 37, 38, 53, 54 allows access to a particular non-manifolded fuel tank. In the present embodiment, the battery 35 is connected to the fuel pump 33 by an electrical line 63. In a preferred embodiment, the pump 33 is secured by mounting brackets 64 and connected to a pump intake fuel line 60 which connects to the fuel purge system 59. In a preferred embodiment, the fuel purge system 59 has a valve handle 46 which activates the fuel purge system mechanically. In a preferred embodiment the air eliminator 39 may have a temperature probe 52, an air output exhaust line 58, and a non-spill quick connect multi-tank selector valve 57. In a preferred embodiment, the fuel line 56 utilizes quick connector fittings 61 and 62 which are uniform throughout the present invention where possible to easily attach or detach fuel lines and fittings for maintenance.

Figure 8:
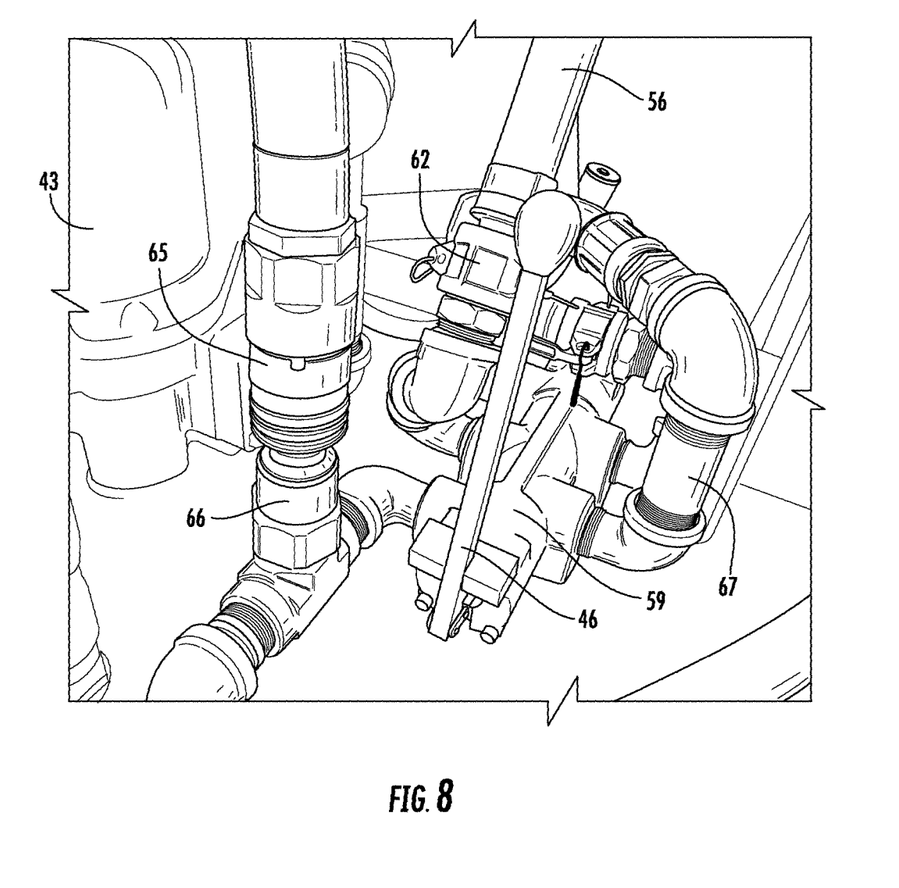
FIG. 8 is an exploded perspective view showing an embodiment of the fuel purge component.

FIG. 8 is an exploded perspective view showing an embodiment of the fuel purge components. A preferred embodiment of the present invention includes a fuel purge system that allows the flow of fuel in the fuel line 56 to be reversed back into the fuel tanks in order to comply with federal regulations. Quick connect fittings 62 are used to easily attach the fuel line 56 to the reverse flow purge valve 59. In one preferred embodiment of the fuel purge system, the valve handle 46 mechanically activates the system by activating the reverse flow purge valve 59. The fuel purge system connects using a female dry-break quick connect coupler valve 65 which connects to a male dry-break quick connect adapter valve 66. The advantage of this style of valves are that there is no risk of fuel leaking at the valves when connecting or disconnecting them. Alternatively, n another embodiment of the fuel purge system, the system can be electronically activated to reverse the flow through the purge valve 59.

Figure 9:
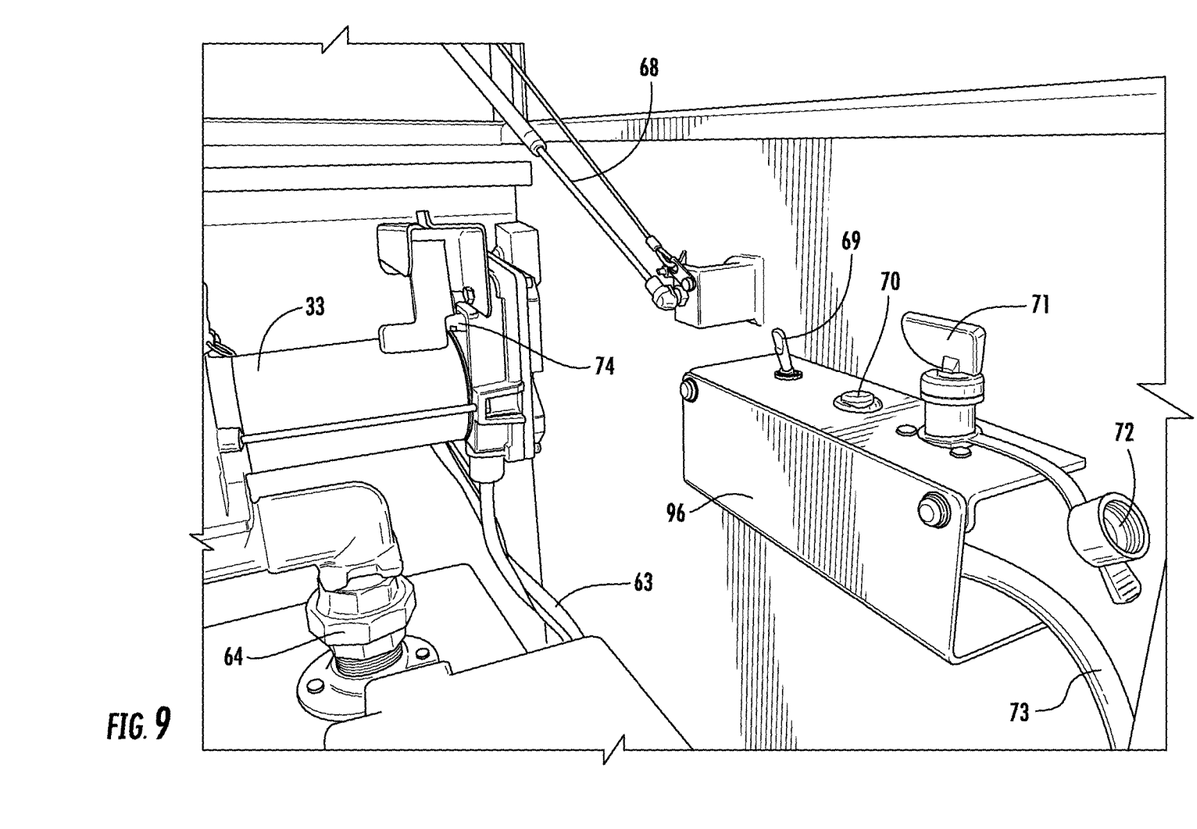
FIG. 9 is an exploded perspective view showing an embodiment of the fuel pump controls.

FIG. 9 is an exploded perspective view showing an embodiment of the fuel pump controls. In a preferred embodiment of the fuel pump controls, the fuel pump 33 has an on/off switch 74 on the fuel pump 33. In another preferred embodiment, an accessible control box has a light switch 69, a power indicator light 70, a pump power emergency switch 71 with a protective cover 72 which is connected to a power control cable 73.

Figure 10:
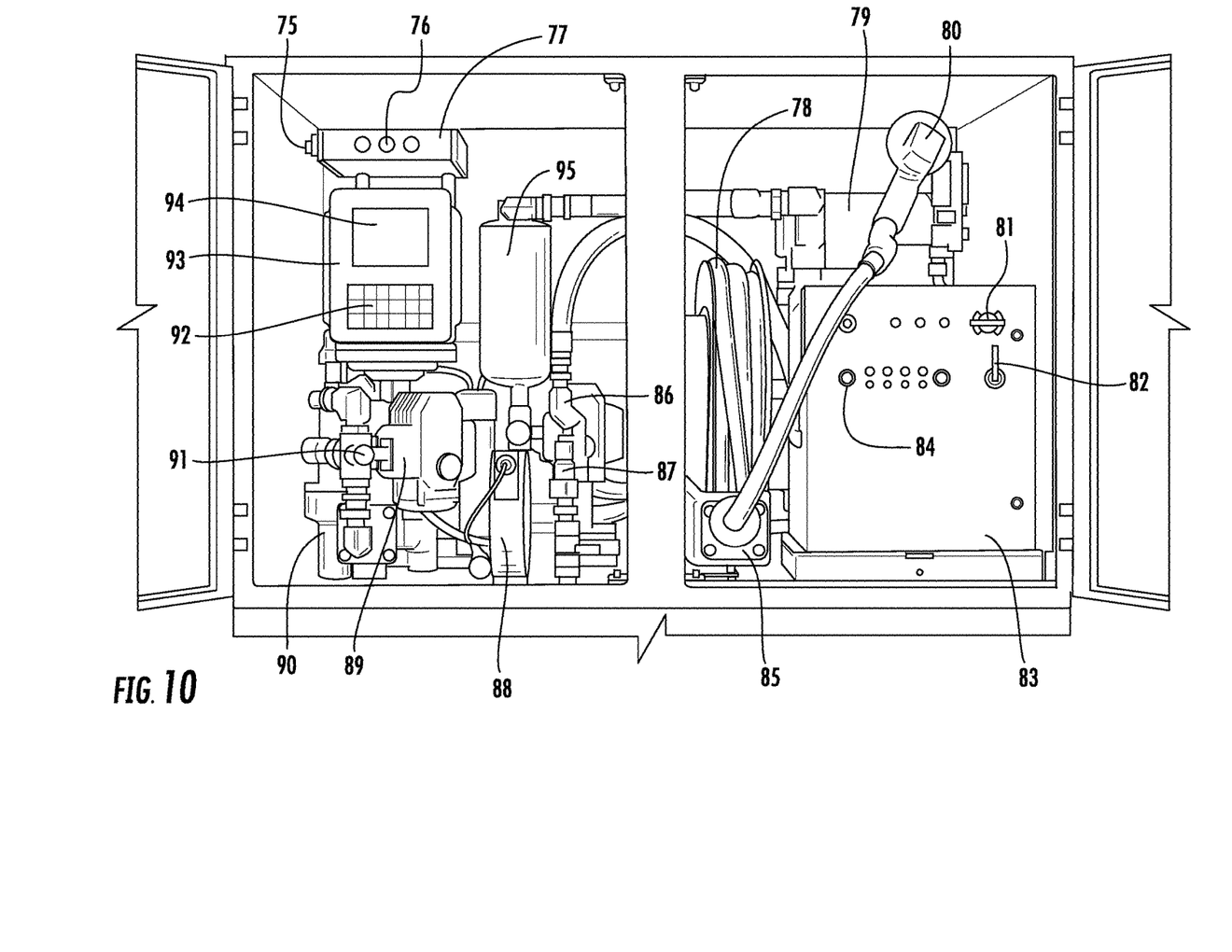
FIG. 10 is a rear view showing another embodiment of the present invention with electronic and semi-automated controls.

FIG. 10 is a rear view showing another embodiment of the present invention with electronic and semi-automated controls. In this preferred embodiment, many of the mechanical controls shown in the prior views have been replaced with electronic controls. In this preferred embodiment, there is a digital electronic register computer 93 with a keypad 92 and touch screen display 94 that has an Ethernet, USB, WI-FI, and cellular data connection system 75, light-emitting diode push button interface 76, and electronic transaction reporting computer system with global positioning system capabilities, tank level sensor reading, pump controller ability, meter reading, and security monitoring 77. In this preferred embodiment, there is an electronic control housing 83 that includes an emergency power disconnect switch 81, an on/off pump and purge controller switch 82, and a series of indicator lights 84 which can provide information on such functionality as valve position, pump status, and fueling controller. Notice that in this preferred embodiment the location of the fuel hose 78 the fuel hose reel 85, are different than in earlier described embodiments. It is understood that there are many variations on exactly how the disclosed and described components could be assembled or located in the present invention. In the present preferred embodiment, the purge system valve actuator 89 is an electronically activated version instead of mechanically activated.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed:

1. A trailer system for the transportation, storage, and dispensing of liquid fuel, the trailer system comprising:
    a plurality of non-manifolded fuel tanks, wherein each of the plurality of non-manifolded fuel tanks is independent of the others;
    a fuel dispensing system consisting of a fuel pump, a fuel hose, and a nozzle, wherein the nozzle is configured to dispense the liquid fuel from more than one of the plurality of non-manifolded fuel tanks;
    a trailer platform comprising wheels and a frame sufficient to support the weight of the entire trailer system while the plurality of non-manifolded fuel tanks are full of the liquid fuel, the trailer system having the ability to be towed by a vehicle; and
    a valve system to allow the fuel pump to select which of the plurality of non-manifolded fuel tanks it is connected to in order to dispense the liquid fuel from at least one particular fuel tank within the plurality of non-manifolded fuel tanks.

2. The system of claim 1, further comprising of a fuel purge system.

3. The system of claim 2, wherein the fuel purge system comprises at least one valve which reverses the flow of the liquid fuel from within the fuel hose back into at least one of the plurality of non-manifolded fuel tanks as selected by an end user.

4. The system of claim 3, said valve of the fuel purge system is an electronically activated valve.

5. The system of claim 4, said electronic activation is automatic once mechanically initiated by an end user.

6. The system of claim 4, said electronic activation is automatic once dispensing liquid fuel is completed.

7. The system of claim 4, said electronic activation is automatically controlled by a computer system.

8. The system of claim 3, wherein the at least one valve of the fuel purge system is a mechanically activated valve.

9. The system of claim 2, wherein the fuel purge system utilizes the fuel pump to invert the flow of the liquid fuel.

10. The system of claim 1, wherein the valve system is a non-spill quick release valve system.

11. The system of claim 1, wherein each of the plurality of non-manifolded fuel tanks has an individual capacity no greater than one hundred and nineteen gallons.

12. A trailer system for the transportation, storage, and dispensing of liquid fuel, the trailer system comprising:
    a plurality of non-manifolded fuel tanks, wherein each of the plurality of non-manifolded fuel tanks is independent of the others;
    a fuel dispensing system consisting of a fuel pump, a fuel hose, and a nozzle, wherein the nozzle is configured to dispense the liquid fuel from more than one of the plurality of non-manifolded fuel tanks;
    a trailer platform comprising wheels and a frame sufficient to support the weight of the entire trailer system while the plurality of non-manifolded fuel tanks are full of the liquid fuel, and the ability to be towed by a vehicle;
    a valve system to allow the fuel pump to select which of the plurality of non-manifolded fuel tanks it is connected to in order to dispense the liquid fuel from at least one particular fuel tank within the plurality of non-manifolded fuel tanks; and
    a custody-transfer flow meter.

13. The system of claim 12, further comprising of a fuel purge system.

14. The system of claim 13, wherein the fuel purge system comprises at least one valve which reverses the flow of the liquid fuel from within the fuel hose back into at least one of the plurality of non-manifolded fuel tanks as selected by an end user.

15. The system of claim 14, said valve of the fuel purge system is an electronically activated valve.

16. The system of claim 15, said electronic activation is automatic once mechanically initiated by an end user.

17. The system of claim 15, said electronic activation is automatic once dispensing liquid fuel is completed.

18. The system of claim 15, said electronic activation is automatically controlled by a computer system.

19. The system of claim 14, wherein the at least one valve of the fuel purge system is a mechanically activated valve.

20. The system of claim 13, wherein the fuel purge system utilizes the fuel pump to invert the flow of the liquid fuel.

21. The system of claim 12, wherein the valve system is a non-spill quick release valve system.

22. The system of claim 12, wherein each of the plurality of non-manifolded fuel tanks has an individual capacity no greater than one hundred and nineteen gallons.

* * * * *